(12) United States Patent
Kim et al.

(10) Patent No.: US 7,526,083 B2
(45) Date of Patent: Apr. 28, 2009

(54) GROUND CONNECTING APPARATUS FOR MOBILE TERMINAL

(75) Inventors: Seon-Kyeng Kim, Suwon-si (KR);
Wan-Jin Choi, Suwon-si (KR);
Ju-Hyung Lee, Gwacheon-si (KR);
Jung-Ho Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 706 days.

(21) Appl. No.: 10/894,160

(22) Filed: Jul. 19, 2004

(65) Prior Publication Data

US 2005/0030233 A1      Feb. 10, 2005

(30) Foreign Application Priority Data

Aug. 8, 2003   (KR)   ............ 10-2003-0055075

(51) Int. Cl.
*H04M 1/00* (2006.01)
*H04M 9/00* (2006.01)

(52) U.S. Cl. .............. 379/433.13; 379/433.11; 455/575.3

(58) Field of Classification Search ............ 379/433.13, 379/433.01, 429, 428.01; 455/550.1, 90.3, 455/575.1, 575.3; 16/303
See application file for complete search history.

(56) References Cited

U.S. PATENT DOCUMENTS

| | | | |
|---|---|---|---|
| 5,001,659 A * | 3/1991 | Watabe | .......... 361/681 |
| 5,508,709 A | 4/1996 | Krenz et al. | |
| 6,272,356 B1 | 8/2001 | Dolman et al. | |
| 6,808,402 B2 * | 10/2004 | Ryu et al. | ............ 439/165 |
| 6,903,694 B2 * | 6/2005 | Kim | ............ 343/702 |
| 2004/0142735 A1 * | 7/2004 | Yi | ............ 455/575.3 |
| 2004/0204027 A1 * | 10/2004 | Park et al. | ............ 455/550.1 |

FOREIGN PATENT DOCUMENTS

| EP | 1 258 943 | 11/2002 |
|---|---|---|
| EP | 1 329 981 | 7/2003 |

* cited by examiner

*Primary Examiner*—Curtis Kuntz
*Assistant Examiner*—Phylesha Dabney
(74) *Attorney, Agent, or Firm*—The Farrell Law Firm, PC

(57) ABSTRACT

Disclosed is a ground connecting apparatus for a mobile terminal, in which grounds formed on the terminal are directly or indirectly connected so as to reduce an SAR value, thereby adjusting a connection length of the grounds. The ground connecting apparatus for a folder-type mobile terminal, which has a main body including a main body-side ground, a folder including a folder-side ground, a hinge unit and a hinge module, includes a hinge shaft connected to one end of the hinge module; a hinge contact means installed at a designated position on the first PCB so that the hinge contact means is connected to a first PCB-side ground connecting pad provided on the first PCB and adjusts an electrical connection length of the grounds; a pin connector installed at the other end of the hinge module; and a hinge connecting means installed at the pin connector so that the hinge connecting means is connected to a second PCB-side ground connecting pad provided on the second PCB and adjusts the electrical connection length of the grounds.

8 Claims, 11 Drawing Sheets

GROUND CONNECTING APPARATUS FOR MOBILE TERMINAL

PRIORITY

This application claims priority to an application entitled "GROUND CONNECTING APPARATUS FOR MOBILE TERMINAL", filed in the Korean Industrial Property Office on Aug. 8, 2003 and assigned Serial No. 2003-55075, the contents of which are hereby incorporated by reference.

BACKGROUND OF THE INVENTION

1. Field of the Invention

The present invention relates to a ground connecting apparatus for a mobile terminal, and more particularly to a ground connecting apparatus for a mobile terminal in which grounds are directly or indirectly connected so as to reduce an Specific Absorption Rate (SAR) value, thereby adjusting a connection length of the grounds.

2. Description of the Related Art

Generally, in order to satisfy various requirements of consumers, mobile communication devices have been developed to provide multiple functions including voice communication, radio reception, and, MP3 music download via the Internet, and now provide access to various data including images through the use of cellular phones, PDAs, computers and notebook computers via data digitization. Such data are band-compressed using sound or picture technologies, and are then easily and efficiently transferred to various mobile communication devices via digital wireless communication or digital wireless broadcasting. These mobile communication devices include an HHP (Hand Held Phone), a CT-2 cellular phone, a smart phone, a digital phone, a PCS phone, a PDA (Personal Digital Assistant), and a notebook computer, etc.

Mobile communication devices are divided into several types according to their external shapes. An LCD is generally used as a data output unit. A keypad for inputting data includes a plurality of keys arranged in an array. Further, an antenna unit for receiving a signal transferred from a counterpart is installed at a suitable position on a main body of the mobile communication device. An essential object of the antenna unit is to increase efficiency thereof, and problem of the antenna unit to be solved is the decrease in SAR (Specific Absorption Rate).

The antenna units of conventional mobile terminals are divided into external antennas installed on the outside of the main body of the mobile terminal, such as a whip antenna, a helical antenna, a sleeve antenna, an N-type antenna, a chip antenna, a Frequency Shift-Planar Inverted-F Antenna (FS-PIFA), etc., and internal antennas installed on the inside of the main body of the mobile terminal, such as an inverted F-type antenna, a planar inverted F-type antenna, a diversity antenna, a microstrip antenna, a twisted loop antenna, etc. Further, the antenna units of the mobile terminals are divided into monopole antennas and planar antennas having a planar structure according to methods of exciting radiated electromagnetic waves. The monopole antennas include external antennas, such as whip antennas, helical antennas, sleeve antennas, chip antennas, and N-type antennas; and the planar antennas include inverted F-type antennas, planar inverted F-type antennas, diversity antennas, microstrip antennas, and FS-PIFAs. Here, the above-described monopole antennas are external antennas. On the other hand, a semi-exposed fixed-type monopole antenna which was recently developed, an internal monopole antenna employing a wave absorber, and a monopole antenna for a folder-type terminal for decreasing an SAR value are internal antennas, and have a broadband property and a low SAR value. The semi-exposed fixed-type monopole antenna has excellent efficiency, but has a reduced effect on the value of the SAR lower than that of the internal monopole antenna employing the wave absorber. The internal monopole antenna employing the wave absorber has an excellent reduction effect of the value of the SAR, but has efficiency lower than that of the semi-exposed fixed-type monopole antenna. Further, the semi-exposed fixed-type monopole antenna, the same as the conventional whip antenna, is disadvantageous in that it is difficult to perform impedance matching due to an enlarged coupling portion between the antenna unit and the folder of the mobile terminal. In addition, radiation efficiency is reduced by approximation between the antenna unit and a user's head, and a ground area having a designated size is required. Accordingly, it is difficult to reduce the thickness of the mobile terminal employing the semi-exposed fixed-type monopole antenna. The above monopole antenna for the folder-type terminal for decreasing SAR is proposed to solve these problems, thus having good properties both in the antenna efficiency and the reduction of the SAR value.

However, the above monopole antenna for the folder-type terminal for decreasing the SAR is designed such that the wave absorber is located at a position adjacent to a hinge connection unit installed at a folding portion between a main body and a folder of the terminal, thereby increasing the SAR due to the leakage of electromagnetic waves via the folding portion. As shown in FIGS. 1 and 2, a folder-type mobile terminal comprises a main body 10 including a plurality of keys 11 allowing a user to input desired data by pressing the keys, and a microphone 12. The folder-type mobile terminal further comprises a folder 20 including a main LCD 21 for displaying the input data, and a speaker 22. The main body 10 is connected to the folder 20 about a hinge axis (A1), and a hinge unit 30 is installed such that the folder 20 is rotated to be opened from and closed to the main body 10 centering on the hinge axis (A1). The main body 10 further includes a first PCB 13, and a main body-side ground 14 formed on the first PCB 13. The folder 20 further includes a second PCB 23, and a folder-side ground 24 formed on the second PCB 23. The hinge unit 30 includes side hinge arms 31 respectively installed at both sides of the main body 10, and a central hinge arm 32 installed on the folder 20 so that it is rotatably connected to the side hinge arms 31. A hinge module 50 is installed in the central hinge arms 32.

As shown in FIG. 1, an antenna unit 40 is installed at a designated position of the upper end of the main body 10, and the first PCB 13 is installed in the main body 10. The main body-side ground 14 is installed on the first PCB 13. A main LCD 21 is provided on the front surface of the folder 20, and a sub LCD (not shown) is provided on the rear surface of the folder 20. The second PCB 23 is installed in the folder 20. The folder-side ground 24 is installed on the second PCB 23.

In the conventional folder-type mobile terminal, in order to widen the folder 20 or contribute to the convenience in a process for manufacturing the terminal, the antenna unit 40 is installed on the upper surface of the main body 10 adjacent to hinge axis (A1).

Accordingly, electromagnetic waves from a feeder unit of the antenna unit 40 are leaked via a gap between the main body 10 and the folder 20, thereby raising the SAR value.

In accordance with conventional research results of the antenna employed by the folder-type mobile terminal products, the connection of the upper and lower portions of the folder converts the radiation properties of the antenna unit into directivity and disperses electric current density, which is concentrated at the gap between the main body and folder. Most of the folder-type mobile terminals are designed such that a data cable passes in the opposite direction of the antenna unit, and the main body-side ground 14 and the folder-side ground 24 are connected. In cases in which the main body-side ground 14 and the folder-side ground 24 are connected at a position adjacent to the antenna unit, a gain of the terminal is reduced and radiation toward a user's head in proportion to the reduction of the gain is decreased. The above results are obtained by directly connecting the main body-side ground 14 and the folder-side ground 24 at the position adjacent to the antenna unit or by connecting the main body-side ground 14 and the folder-side ground 24 in a call connection state.

However, since the conventional connection of the grounds employs a method of electrically and directly connecting the grounds only for reducing the SAR value, it is possible to directly connect the main body-side ground and the folder-side ground in the folder-type mobile terminal only at both ends of the hinge unit. In cases in which the direct connection of the grounds is performed at the above position adjacent to the antenna unit, the gain of the terminal is remarkably reduced, and thus field performance of the antenna unit deteriorates.

Further, the reduction of the gain and the radiation properties, such as the decrease of radiation toward the user's head, influence a position, a length and a thickness of a connection portion of the grounds, thus not being capable of allowing the antenna unit to obtain a desired result.

SUMMARY OF THE INVENTION

Therefore, the present invention has been made in view of the above problems, and it is an object of the present invention to provide a ground connecting apparatus for a mobile terminal, in which grounds formed on the folder-type mobile terminal are directly or indirectly connected so that an electrical connection length of the grounds is adjustable, thereby preventing reduction in a gain of the terminal.

It is another object of the present invention to provide a ground connecting apparatus for a mobile terminal, in which grounds formed on the terminal are directly or indirectly connected so that an electrical connection length of the grounds is adjustable, thereby preventing reduction in an SAR value of the terminal, improving field performance of the terminal, and adjusting radiation properties of an antenna unit of the terminal.

It is yet another object of the present invention to provide a ground connecting apparatus for a mobile terminal, in which grounds formed on the terminal are directly or indirectly connected so that an electrical connection length of the grounds is adjustable, thereby adjusting radiation properties of an antenna unit of the terminal and reducing radiation in a direction toward a user's head.

In accordance with the present invention, the above and other objects can be accomplished by the provision of a ground connecting apparatus for a folder-type mobile terminal, which has a main body including a first PCB and a main body-side ground formed on the first PCB, a folder including a second PCB and a folder-side ground formed on the second PCB, a hinge unit including side hinge arms formed at both sides of the main body and a central hinge arm formed at a central portion of the folder so as to be rotatably connected to the side hinge arms, and a hinge module installed in the central hinge arm, the ground-connecting apparatus including: a hinge shaft connected to one end of the hinge module; a hinge contact means installed at a designated position on the first PCB so that the hinge contact means is connected to a first PCB-side ground connecting pad provided on the first PCB and adjusts an electrical connection length of the ground; a pin connector installed at the other end of the hinge module; and a hinge connecting means installed at the pin connector so that the hinge connecting means is connected to a second PCB-side ground connecting pad provided on the second PCB and adjusts the electrical connection length of the ground.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
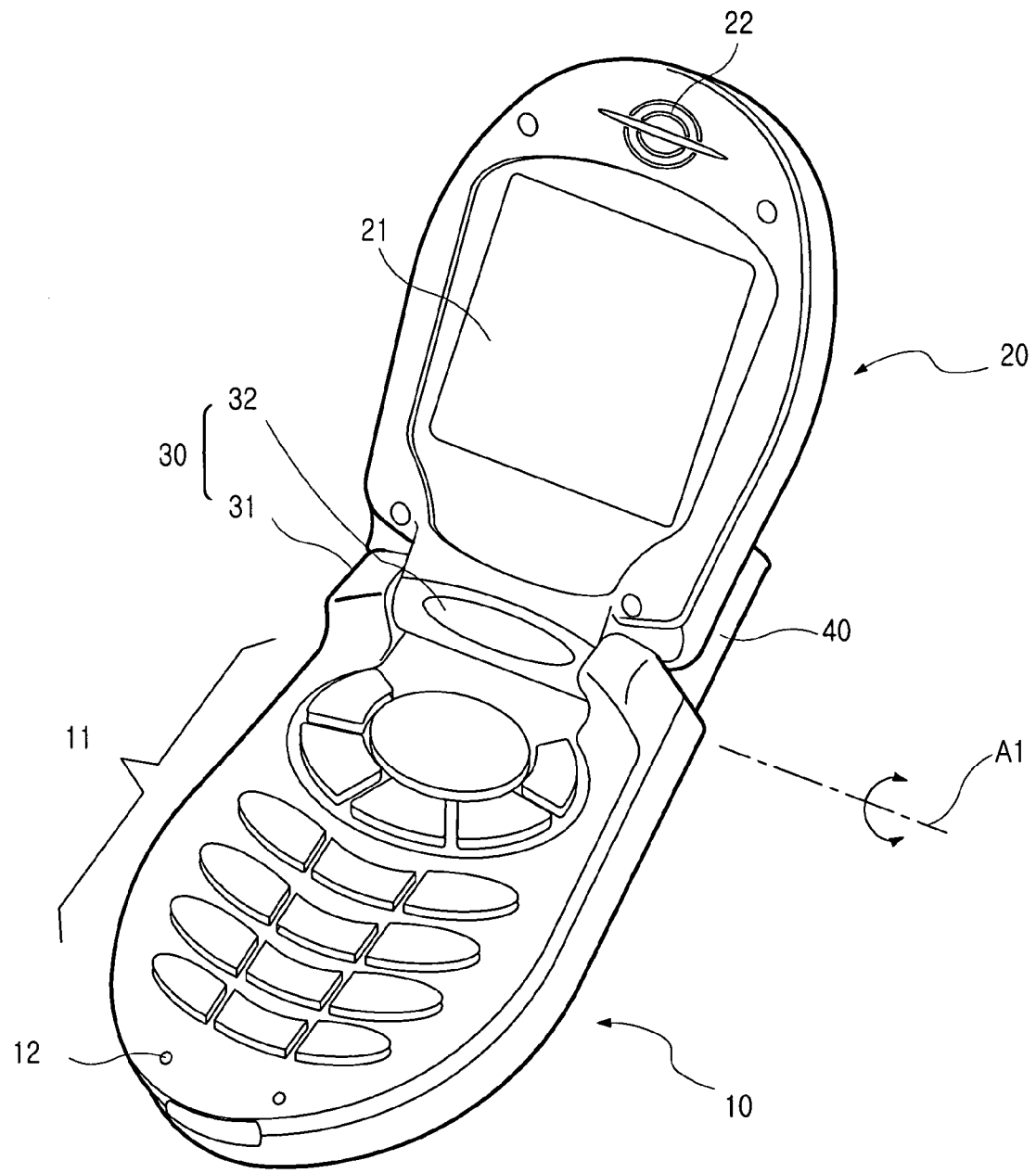
FIG. 1 is a perspective view of a conventional folder-type mobile terminal in an opened state of a folder from a main body.
Figure 2:
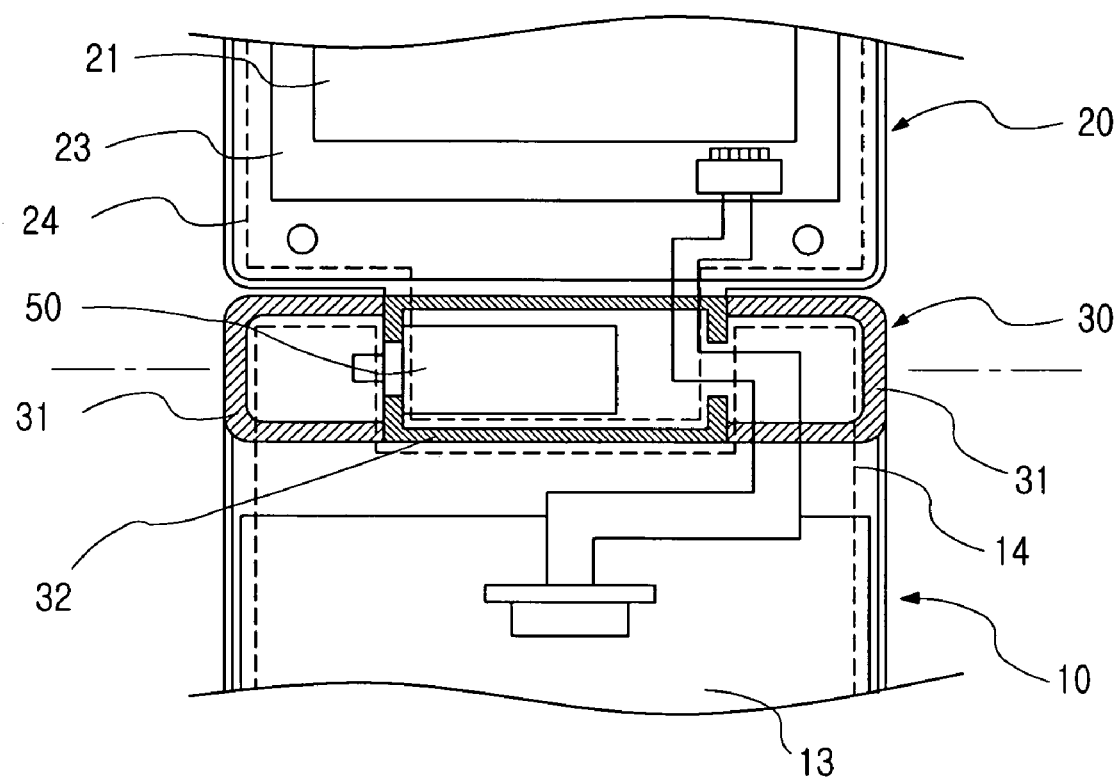
FIG. 2 is a cross-sectional view illustrating grounds of the main body and the folder of the conventional folder-type mobile terminal.

Now, preferred embodiments of the present invention will be described in detail with reference to the annexed drawings. In the following description of the present invention, a detailed description of known functions and configurations incorporated herein will be omitted when it may make the subject matter of the present invention unclear.

As shown in FIGS. 3 to 7, a folder-type mobile terminal comprises a main body 10, a folder 20, a hinge unit 30, and a hinge module 50. The main body 10 includes a first PCB 13, and a main body-side ground 14 provided on the first PCB 13. The folder 20 includes a second PCB 23, and a folder-side ground 24 provided on the second PCB 23. The hinge unit 30 includes side hinge arms 31 respectively installed at both sides of the main body 10, and a central hinge arm 32 installed on the folder 20 so that it is rotatably connected to the side hinge arms 31. The hinge module 50 is installed in the central hinge arm 32.

A ground connecting apparatus for the mobile terminal comprises a hinge shaft 200, a hinge contact means 300, a pin connector 400, and a hinge connecting means 500. The hinge shaft 200 is connected to one end of the hinge module 50 so that the hinge shaft 200 contacts the hinge contact means 300. The hinge contact means 300 is installed at a designated position on the first PCB 13 so that the hinge contact means 300 is connected to a ground connecting pad 14a provided on the first PCB 13, and adjusts an electrical connection length of the grounds 14 and 24. The pin connector 400 is provided at the other end of the hinge module 50 so that the pin connector 400 is connected to the hinge connecting means 500. The hinge connecting means 500 is installed at the pin connector 400 so that the hinge connecting means 500 is connected to a ground connecting pad 24a provided on the second PCB 23, and adjusts the electrical connection length of the grounds 14 and 24.

The hinge shaft 200 includes a fixing portion 201 preferably formed in a ring shape to have a central hole, and a contact bar 202 preferably formed in a cylindrical shape. The ring-like fixing portion 201 is connected to a fixing protrusion 51 formed on the hinge module 50. The cylindrical contact bar 202 protrudes in a longitudinal direction of the hinge unit 30, and is formed at a designated position of the fixing portion 201 so that the contact bar 202 contacts a leaf-type connector spring 301 of the hinge contact means 300. Further, the hinge contact means 300 includes the leaf-type connector spring 301, a spring-side contact unit 302, a first connection pad 303, and a first connection element 304. The leaf-type connector spring 301 is constructed as a leaf or plate spring so that the connector spring 301 easily contacts the cylindrical contact bar 202 of the hinge shaft 200. The spring-side contact unit 302 is formed at one end of the leaf-type connector spring 301 so that the spring-side contact unit 302 contacts the cylindrical contact bar 202 of the hinge shaft 200. The first connection pad 303 is provided at the other end of the leaf-type connector spring 301 so that the first connection pad 303 is connected to the first PCB-side ground connecting pad 14a through the provision of the first connection element 304, which is provided between the first PCB-side ground connecting pad 14a and the first connection pad 303 so as to adjust the electrical connection length of the grounds 14 and 24 and to determine an electrical connection length of RF (Resonance Frequency). The first connection element 304 includes one of an inductor, a resistance and a short circuit. The first connection element 304 is preferably provided in the shape of a coil spring.

A connection unit 401 formed in a ring shape is formed on one end of the pin connector 400 so that the connection unit 401 is connected to a connection protrusion 52 formed on one side surface of the hinge module 50. A pad fixing unit 402 is formed on the other end of the pin connector 400 so that the pad fixing unit 402 is provided with a second connection pad 501 of the hinge connecting means 500. Further, the hinge connecting means 500 includes the second connection pad 501, and a second connection element 502. The second connection pad 501 is provided on the pad fixing unit 402 so that the second connection pad 501 is connected to the second PCB-side ground connecting pad 24a. The second connection element 502 is provided between the second PCB-side ground connecting pad 24a and the second connection pad 501 so as to adjust the electrical connection length of the grounds 14 and 24 and to determine the electrical connection length of RF (Resonance Frequency). The second connection element 502 includes one of an inductor, a resistance and a short circuit. The second connection element 502 is preferably provided in the shape of a coil spring. Further, the hinge module 50 is preferably made of a conductive metal.

Hereinafter, with reference to FIGS. 3 to 10, operation of the above-described ground connecting apparatus for the mobile terminal in accordance with one preferred embodiment of the present invention will be described in detail.

Figure 3:
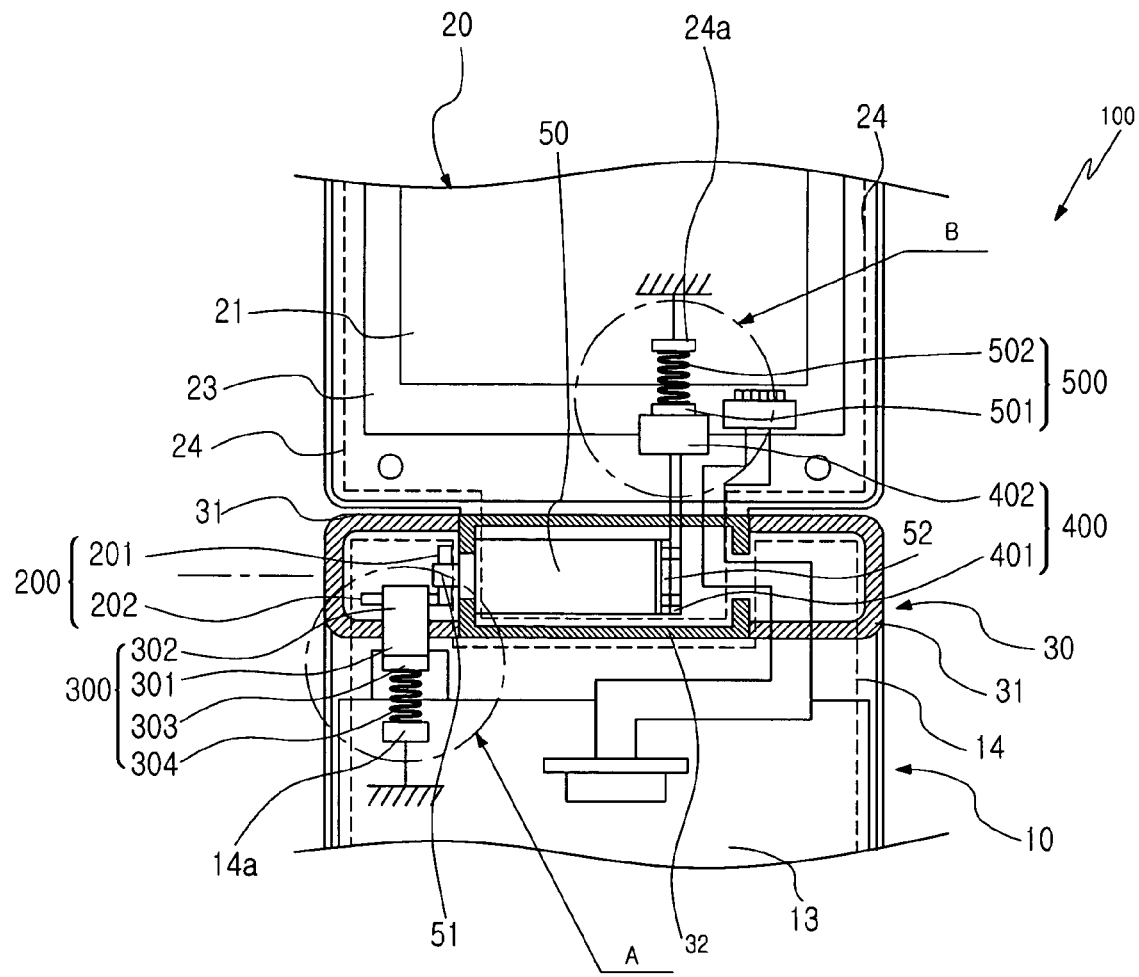
FIG. 3 is a cross-sectional view illustrating an internal structure of a ground connecting apparatus for a mobile terminal in accordance with one embodiment of the present invention.
Figure 4:
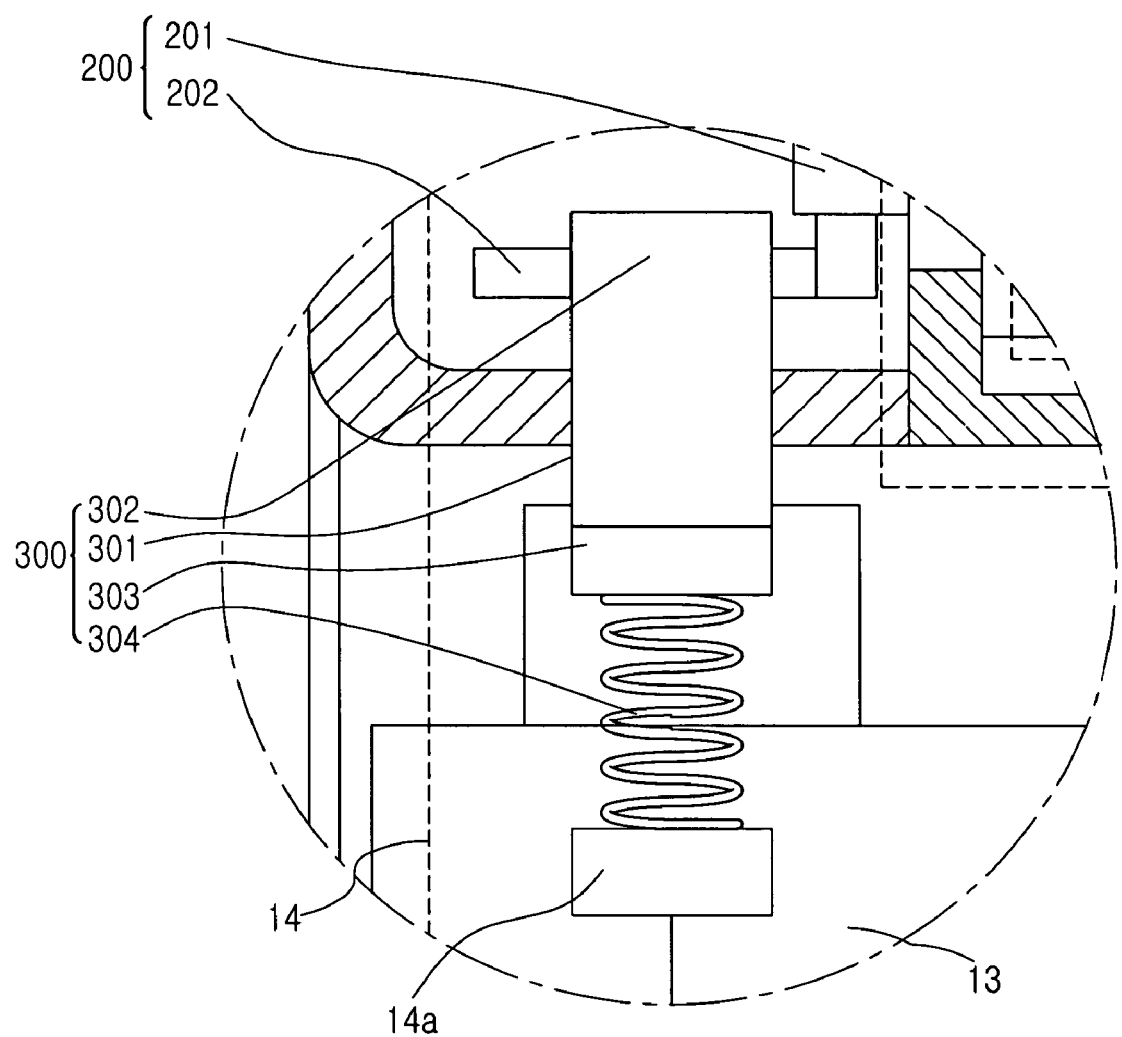
FIG. 4 is an enlarged cross-sectional view of a portion "A" of FIG. 3.
Figure 5:
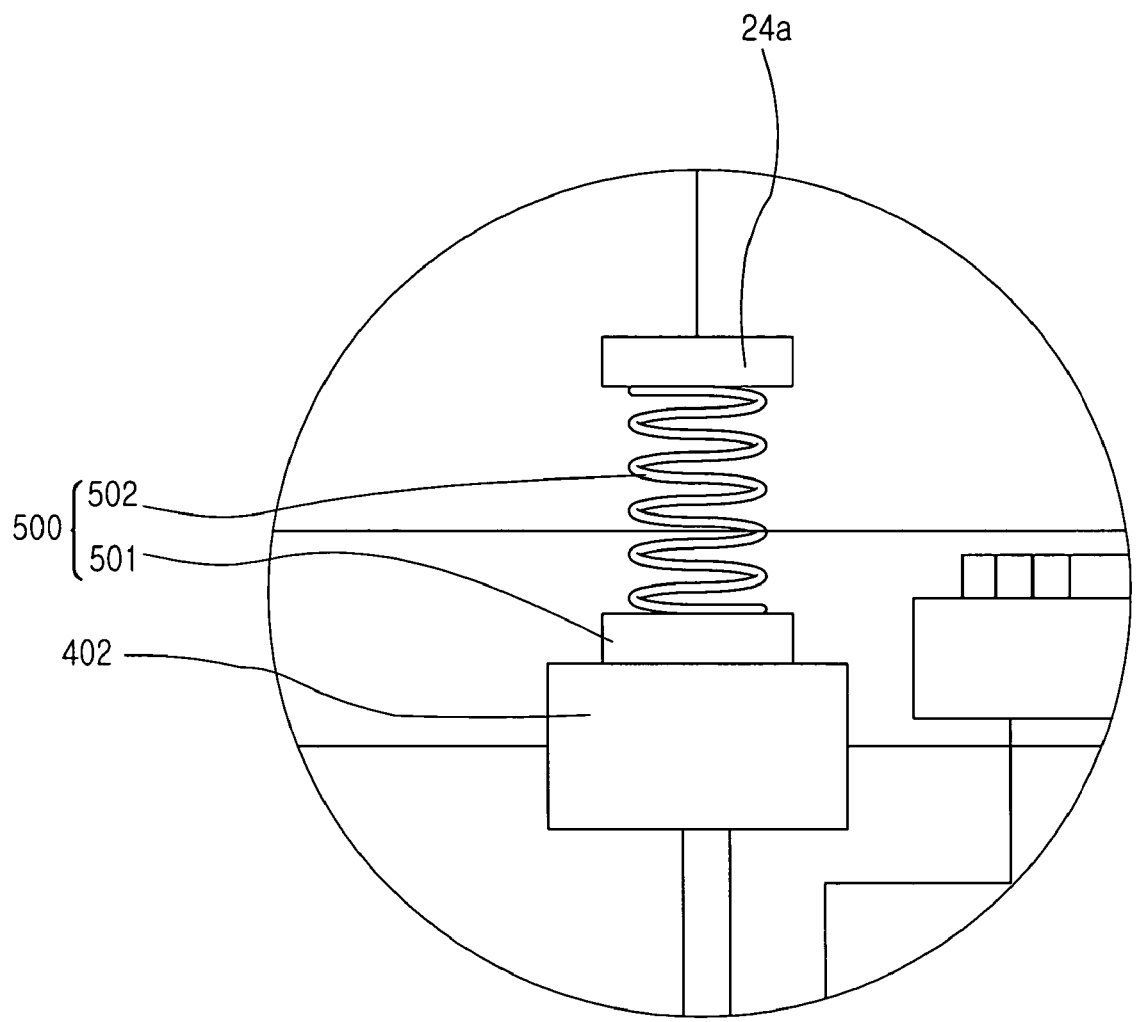
FIG. 5 is an enlarged cross-sectional view of a portion "B" of FIG. 3.

As shown in FIGS. 3 to 5, the main body 10 of the folder-type mobile terminal includes the first PCB 13, and the main body-side ground 14 formed on the first PCB 13. The folder 20 of the folder-type mobile terminal includes the second PCB 23, and the folder-side ground 24 formed on the second PCB 23. The hinge module 50 is installed in the central hinge arm 32 formed on the folder 20.

Figure 6:
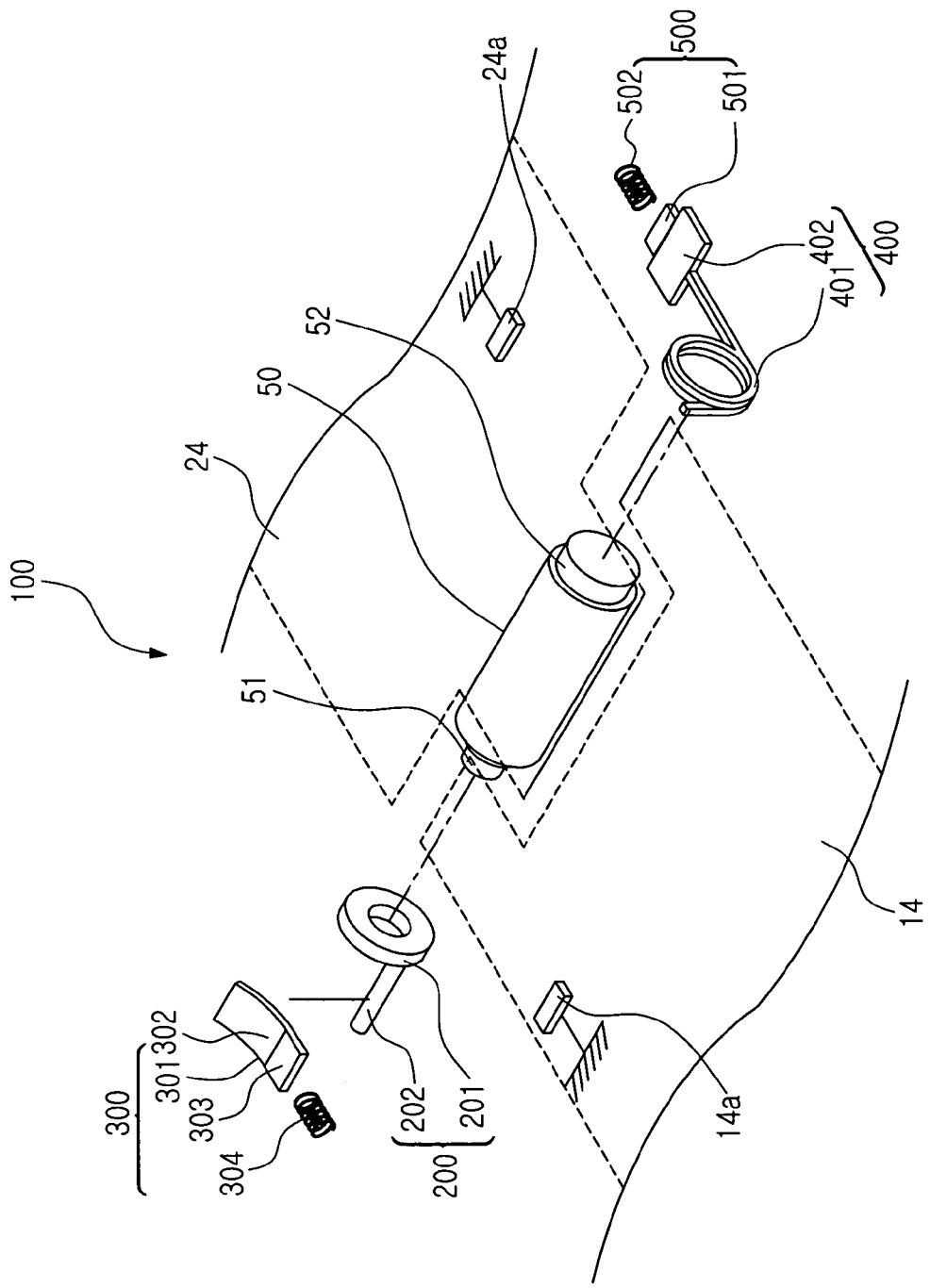
FIG. 6 is an exploded perspective view illustrating construction of the ground connecting apparatus for a mobile terminal in accordance with one embodiment of the present invention.

As shown in FIGS. 4 and 6, the hinge shaft 200 is connected to one end of the hinge module 50 so that the contact bar 202 of the hinge shaft 200 contacts the connector spring 301 of the hinge contact means 300. The hinge shaft 200 includes the ring-like fixing portion 201 so that the fixing protrusion 51 of the hinge module 50 is connected to the fixing portion 201. Accordingly, the fixing protrusion 51 is inserted into the hole of the fixing portion 201. The hinge shaft 200 is installed in one of the side hinge arms 31 formed on the main body 10.

The hinge contact means 300 is provided at a designated position of the first PCB 13 so that the hinge contact means 300 is connected to the first PCB-side ground connecting pad 14a formed on the first PCB 13 and adjusts the electrical connection length of the grounds 14 and 24. The hinge contact means 300 includes the leaf-type connector spring 301, the spring-side contact unit 302, the first connection pad 303, and the first connection element 304. In this state, as shown in FIGS. 5 and 6, the leaf-type connector spring 301 is provided at a designated position of the first PCB 13 so that the connector spring 301 is connected to the first PCB-side ground connecting pad 14a formed on the first PCB 13.

Figure 7:
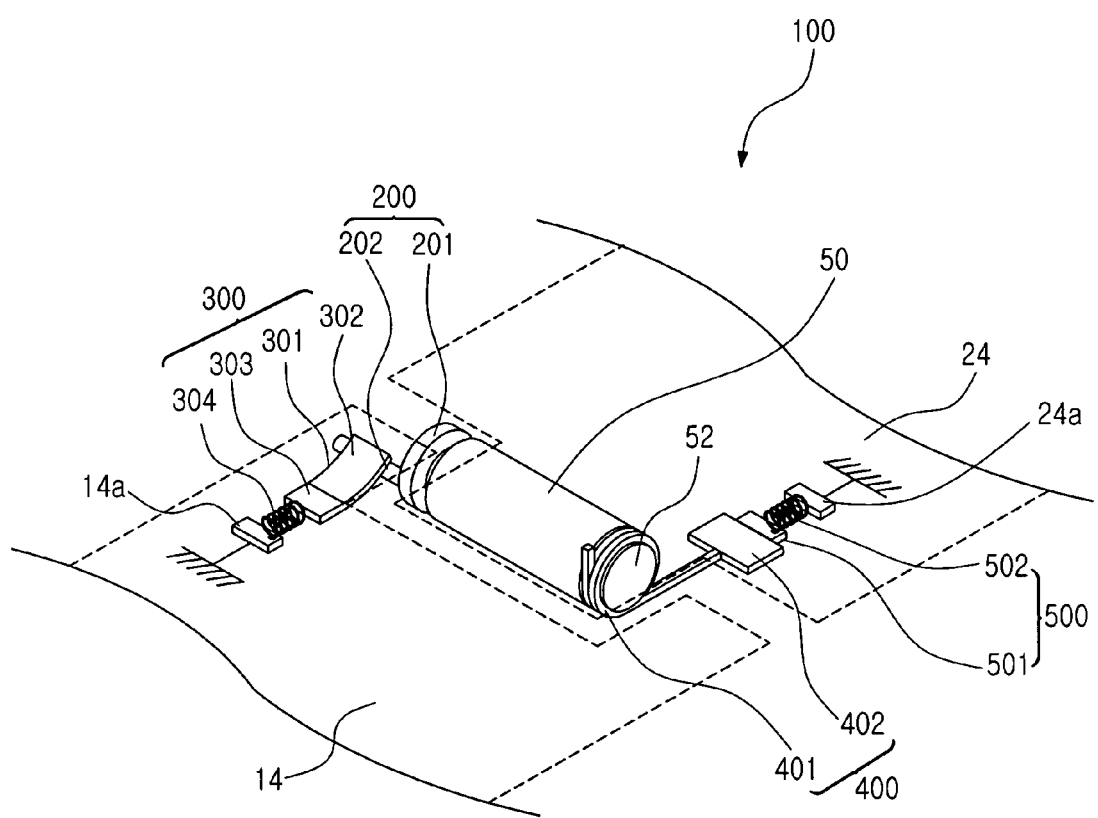
FIG. 7 is an exploded perspective view illustrating the ground connecting apparatus for a mobile terminal in an operating state in accordance with one embodiment of the present invention.

As shown in FIG. 7, the cylindrical contact bar 202 is formed in a longitudinal direction of the hinge unit 30 at a designated position of the fixing portion 201 of the hinge shaft 200 so that the contact bar 202 contacts the plate spring of the connector spring 301. The first connection pad 303 connected to the first PCB-side ground connecting pad 14a is provided at the other end of the connector spring 301. Here, the first connection element 304 is provided between the first PCB-side ground connecting pad 14a and the first connection pad 303 so as to adjust the electrical connection length of the grounds 14 and 24 and to determine the electrical connection length of RF (Resonance Frequency).

The pin connector 400 is provided at the other end of the hinge module 50 so as to electrically connect the main body-side ground 14 and the folder-side ground 24 to each other. The hinge connecting means 500 is formed on the pin connector 400 so that the hinge connecting means 500 is connected to the second PCB-side ground connecting pad 24a formed on the second PCB 23 and adjusts the electrical connection length of the grounds 14 and 24. The hinge connecting means 500 includes the second connection pad 501 and the second connection element 502. The ring-like connection unit 401 is formed on one end of the pin connector 400 so that the connection unit 401 is connected to the connection protrusion 52 formed on one side surface of the hinge module 50. Thereby, the connection protrusion 52 is connected to the ring-like connection unit 401. Here, the pad fixing unit 402 is formed on the other end of the pin connector 400 so that the pad fixing unit 402 is provided with the second connection pad 501 of the hinge connecting means 500. Accordingly, the second connection pad 501 is formed on the pad fixing unit 402.

The second connection element 502 is provided between the second PCB-side ground connecting pad 24a and the second connection pad 501 so as to adjust the electrical connection length of the grounds 14 and 24 and to determine the electrical connection length of RF (Resonance Frequency). Preferably, the hinge module 50 is made of a conductive metal so that the main body-side ground 14 and the folder-side ground 24 are electrically connected to each other. While hinge module 50 is shown as a cylinder, it may take any shape, and is provided as a means for connecting hinge shaft 200 to pin connector 400.

Accordingly, when the folder is opened or closed, the hinge shaft included in the main body-side ground is stationary and the pin connector included in the folder-side ground combines with a protrusion of the hinge module so as to become capable of rotating and rotates with the folder.

Figure 11:
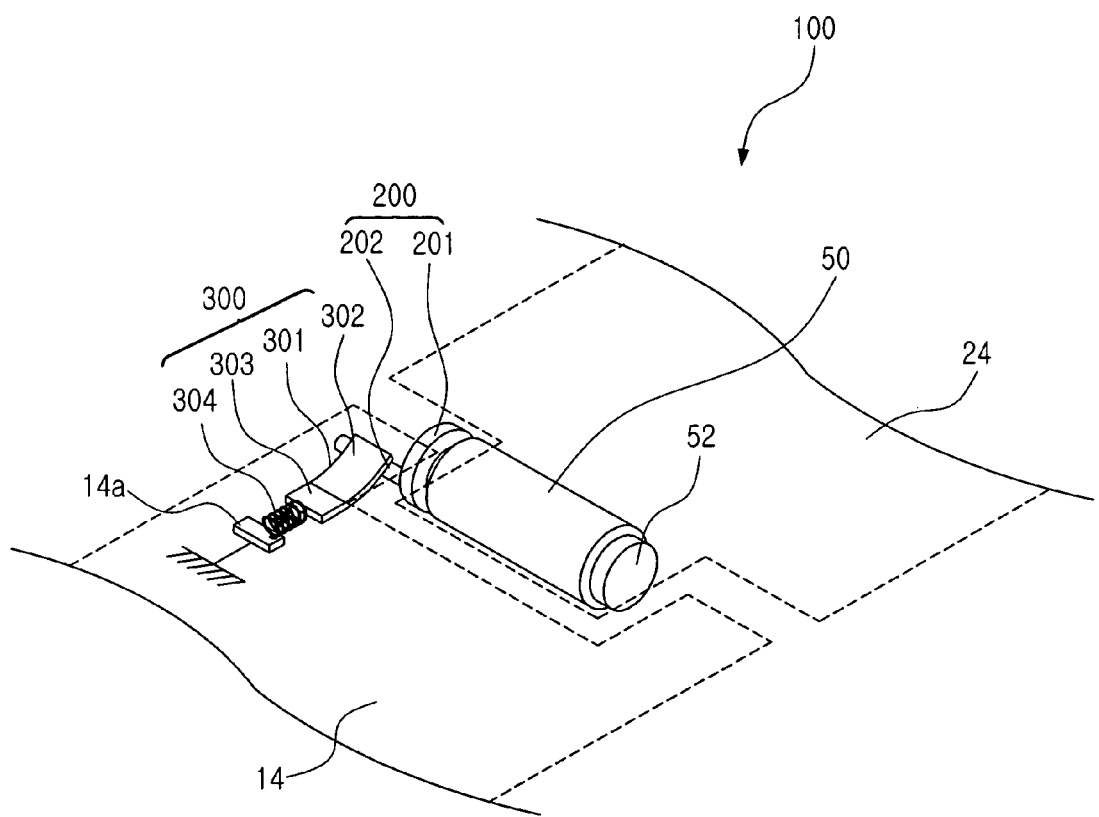
FIG. 11 is an exploded perspective view illustrating the ground connecting apparatus for a mobile terminal in an operating state in accordance with another embodiment of the present invention.

Hereinafter, another embodiment of the ground connecting apparatus for the mobile terminal will be described with reference to FIG. 11.

The main body 10 of the mobile terminal includes the first PCB 13 and the first PCB-side ground 14. The hinge shaft 200 is connected to one end of the hinge module 50 installed in the central hinge arm 32 of the folder 20. The hinge contact means 300 is provided at a designated position of the first PCB 13 so that the hinge contact means 300 is connected to the first PCB-side ground connecting pad 14a formed on the first PCB 13 and adjusts the electrical connection length of the grounds 14 and 24. The hinge contact means 300 is essentially connected to the first PCB-side ground connecting pad 14a of the main body 10, and selectively connected to the second PCB-side ground connecting pad 24a of the folder 20. That is, only the hinge contact means 300 is formed on the main body-side ground connecting pad 14a so as to adjust the electrical connection length of the grounds 14 and 24, and conventional contact means is used on the folder-side ground connecting pad 24a. Here, the first PCB 13 serves as a main PCB of the main body 10, and the second PCB 23 serves as an LCD PCB of the folder 20. The above first and second PCBs 13 and 23 are not limited to a PCB adapted by the folder-type terminal, but may be employed in PCBs of all types of mobile terminals.

Figures 8A, 8B:
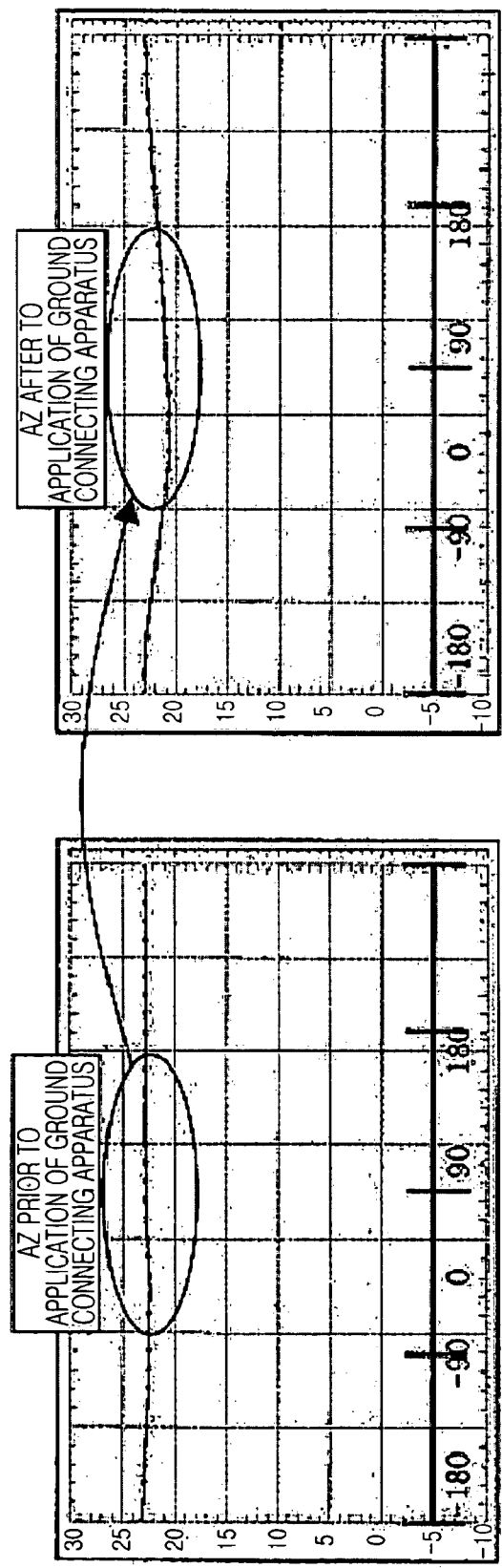
FIGS. 8A and 8B are graphs illustrating Azimuth (Az) radiation patterns of the mobile terminal prior to and after application of the ground connecting apparatus in accordance with the present invention, respectively.
Figures 9A, 9B:
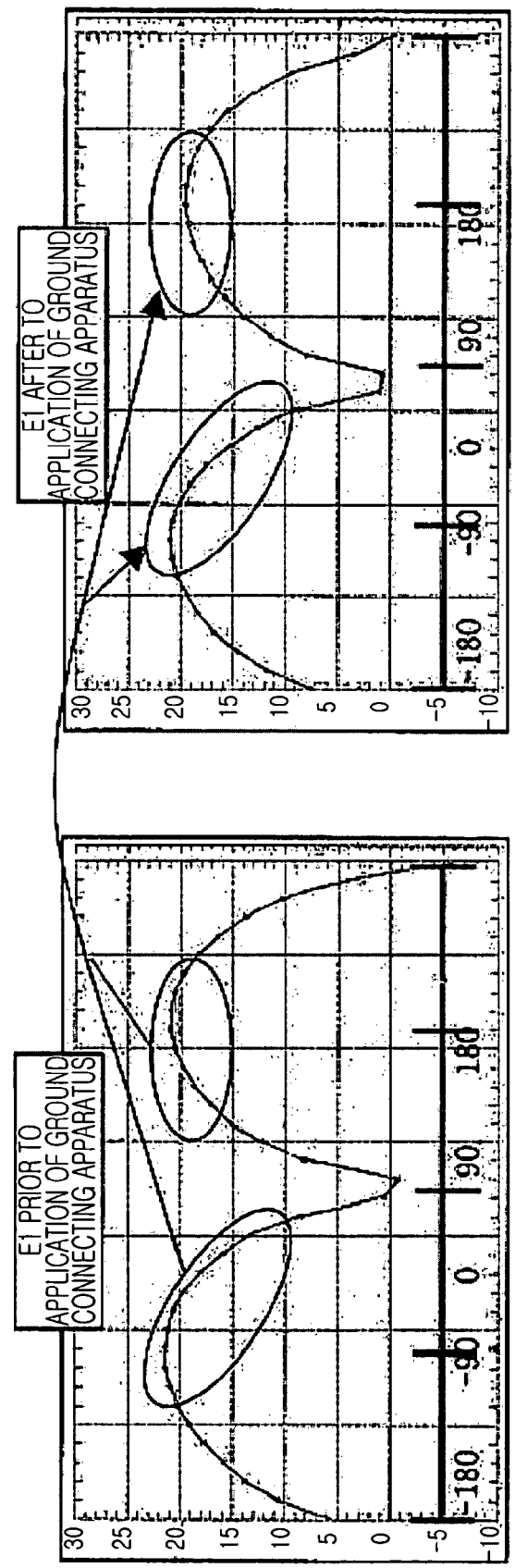
FIGS. 9A and 9B are graphs illustrating Elevation (E1) radiation patterns of the mobile terminal prior to and after application of the ground connecting apparatus in accordance with the present invention, respectively.

Here, FIGS. 8a and 8b are graphs illustrating Azimuth (Az) radiation patterns prior to and after application of the ground connecting apparatus in accordance with the present invention, respectively. Zero (0) degrees represents a direction towards a user's head in radiation patterns. Compared to the Azimuth (Az) radiation pattern prior to application of the ground connecting apparatus, the Azimuth (Az) radiation pattern after application of the ground connecting apparatus shows that radiation in the direction of the user's head is reduced. FIGS. 9a and 9b are graphs illustrating Elevation (E1) radiation patterns prior to and after application of the ground connecting apparatus in accordance with the present invention, respectively. Here, compared to the Elevation (E1) radiation pattern prior to application of the ground connecting apparatus, the Elevation (E1) radiation pattern after application of the ground connecting apparatus shows that radiation in the direction of the user's head is reduced.

Figures 10A, 10B:
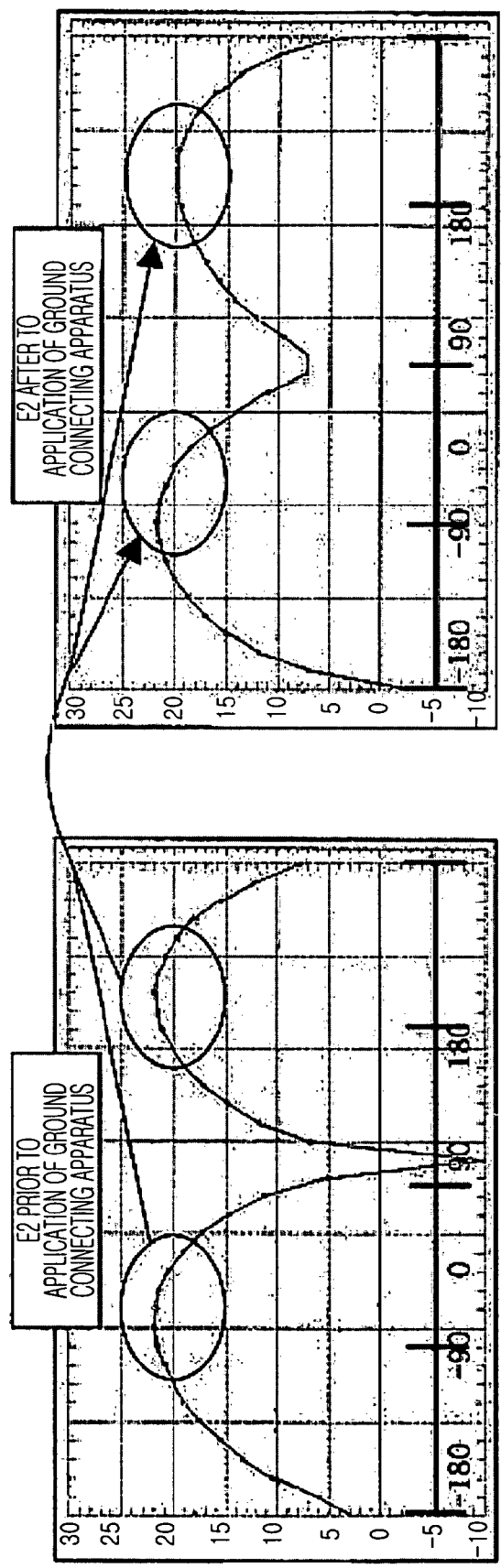
FIGS. 10a and 10b are graphs illustrating Elevation (E2) radiation patterns of the mobile terminal prior to and after application of the ground connecting apparatus in accordance with the present invention, respectively.

FIGS. 10a and 10b are graphs illustrating Elevation (E2) radiation patterns prior to and after application of the ground connecting apparatus in accordance with the present invention, respectively.

Here, compared to the Elevation (E2) radiation pattern prior to application of the ground connecting apparatus, the Elevation (E2) radiation pattern after application of the ground connecting apparatus shows that radiation in the direction of the user's head is reduced.

As apparent from the above description, the present invention provides a ground connecting apparatus for a mobile terminal, in which grounds formed on the terminal are directly or indirectly connected, providing the same effect as the direct connection therebetween in case that respective pads of the grounds are electrically short-circuited, and reducing gain of the terminal and decreasing radiation in a direction of a user's head. Further, the ground connecting apparatus adjusts an electrical connection length of the grounds using first and second connection elements, thereby reducing gain of the terminal to a desired degree and decreasing radiation in the direction of the user's head.

Moreover, the ground connecting apparatus of the present invention reduces an SAR value of the terminal, improves field performance of the terminal and adjusts radiation properties of an antenna of the terminal, thereby decreasing radiation in the direction of the user's head.

Although the present invention has been described in detail in regard to the embodiments described above, those skilled in the art will appreciate that various modifications, additions, and substitutions to the specific elements are possible, without departing from the scope and spirit of the invention as disclosed in the accompanying claims.

What is claimed is:

1. A ground connecting apparatus for a folder-type mobile terminal, which has a main body including a first PCB and a main body-side ground formed on the first PCB, a folder including a second PCB and a folder-side ground formed on the second PCB, a hinge unit including side hinge arms formed at both sides of the main body and a central hinge arm formed at a central portion of the folder so as to be rotatably connected to the side hinge arms, and a hinge module installed in the central hinge arm, comprising:

a hinge shaft connected to one end of the hinge module;
   a hinge contact means in contact with the hinge shaft and installed at a designated position on the first PCB so that the hinge contact means is connected to a first PCB-side ground connecting pad provided on the first PCB and adjusts an electrical connection length of the grounds;
   a pin connector installed at the other end of the hinge module; and
   a hinge connecting means installed at the pin connector so that the hinge connecting means is connected to a second PCB-side ground connecting pad provided on the second PCB and adjusts the electrical connection length of the grounds.

2. The ground connecting apparatus as set forth in claim 1, wherein the hinge shaft includes:

a fixing portion installed in one of the side hinge arms and connected to a fixing protrusion of the hinge module; and
   a contact bar protruding at a designated position of the fixing portion in a longitudinal direction of the hinge unit so that the contact bar contacts the hinge contact means.

3. The ground connecting apparatus as set forth in claim 2, wherein the hinge contact means include:

a leaf-type connector spring;

a spring-side contact unit formed at one end of the connector spring so that the spring-side contact unit contacts the contact bar of the hinge shaft;

a first connection pad formed at the other end of the connector spring so that the first connection pad is connected to the first PCB-side ground connecting pad; and a first connection element provided between the first PCB-side ground connecting pad and the first connection pad so as to adjust the electrical connection length of the grounds.

4. The ground connecting apparatus as set forth in claim 3, further comprising:

a connection unit formed on one end of the pin connector so that the connection unit is connected to a connection protrusion formed on one side surface of the hinge module; and a pad fixing unit formed on the other end of the pin connector so that the pad fixing unit is provided with a second connection pad of the hinge connecting means.

5. The ground connecting apparatus as set forth in claim 4, wherein the hinge connecting means includes:

a second connection pad provided on the pad fixing unit of the pin connector and connected to the second PCB-side ground connecting pad; and a second connection element provided between the second PCB-side ground connecting pad and the second connection pad so as to adjust the electrical connection length of the grounds.

6. The ground connecting apparatus as set forth in claim 1, wherein the hinge module is made of a conductive metal.

7. The ground connecting apparatus as set forth in claim 3, wherein the first connection element is one selected from the group consisting of an inductor, a resistance and a short circuit.

8. The ground connecting apparatus as set forth in claim 5, wherein the second connection element is one selected from the group consisting of an inductor, a resistance and a short circuit.

* * * * *